United States Patent
Umesh et al.

(10) Patent No.: US 8,136,004 B2
(45) Date of Patent: Mar. 13, 2012

(54) RADIO COMMUNICATION APPARATUS AND METHOD USED IN MOBILE COMMUNICATION SYSTEM

(75) Inventors: Anil Umesh, Yokohama (JP); Minami Ishii, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 592 days.

(21) Appl. No.: 12/305,602

(22) PCT Filed: Jun. 15, 2007

(86) PCT No.: PCT/JP2007/062178
§ 371 (c)(1),
(2), (4) Date: May 6, 2009

(87) PCT Pub. No.: WO2007/148635
PCT Pub. Date: Dec. 27, 2007

(65) Prior Publication Data
US 2009/0307553 A1 Dec. 10, 2009

(30) Foreign Application Priority Data
Jun. 20, 2006 (JP) ................................ 2006-170703

(51) Int. Cl.
*H04L 1/18* (2006.01)
(52) U.S. Cl. ...................................... 714/748; 370/242
(58) Field of Classification Search .................. 714/748; 370/242
See application file for complete search history.

(56) References Cited

U.S. PATENT DOCUMENTS

| | | | |
|---|---|---|---|
| 3,876,979 A * | 4/1975 | Winn et al. ................... | 714/748 |
| 4,144,522 A * | 3/1979 | Kageyama et al. ............ | 714/748 |
| 6,353,746 B1 * | 3/2002 | Javitt ........................... | 455/66.1 |
| 6,522,650 B1 * | 2/2003 | Yonge et al. .................. | 370/390 |
| 6,831,912 B1 * | 12/2004 | Sherman ....................... | 370/349 |
| 7,457,305 B2 * | 11/2008 | Koponen et al. .............. | 370/428 |

(Continued)

FOREIGN PATENT DOCUMENTS

JP 58-201465 11/1983

(Continued)

OTHER PUBLICATIONS

Samsung, "Mac functions: ARQ," 3GPP TSG-RAN Meeting #52, R2-060907, Athens, Greece, Mar. 27-31, 2006 [retrieved on Sep. 10, 2007]. Retrieved from the Internet: <URL: http://www.3gpp.org/ftp/tsg_ran/WG2_RL2/TSGR2_52/Documents/R2-060907.zip>, 5 pages.

(Continued)

*Primary Examiner* — Yolanda L Wilson
(74) *Attorney, Agent, or Firm* — Osha Liang LLP

(57) ABSTRACT

A radio communication apparatus including a retransmission control function, includes: determination means configured to determine whether a result of error detection performed in a communication partner side for a first packet after transmitting the first packet to the communication partner is positive acknowledgement or negative acknowledgement; request means configured to request a following second packet from an upper layer when the result of error detection is determined to be positive acknowledgement; and means configured to transmit dummy data to the communication partner as a following second packet when the first packet is the last packet. When the determination determining that the result of error detection is positive acknowledgement is incorrect, a system frame number used when transmitting the dummy data is reported from the communication partner, so that the first packet is retransmitted.

7 Claims, 3 Drawing Sheets

U.S. PATENT DOCUMENTS

| | | | |
|---|---|---|---|
| 7,808,906 B2 * | 10/2010 | Rao et al. | 370/235 |
| 2002/0174395 A1 * | 11/2002 | Chen et al. | 714/748 |
| 2007/0177630 A1 * | 8/2007 | Ranta et al. | 370/473 |

FOREIGN PATENT DOCUMENTS

| | | |
|---|---|---|
| JP | 8-032531 A | 2/1996 |
| JP | 10-290234 A | 10/1998 |
| JP | 2003-530017 A | 10/2003 |

OTHER PUBLICATIONS

Patent Abstracts of Japan, Publication No. 58-201465, dated Nov. 24, 1983, 1 page.

International Search Report issued in PCT/JP2007/062178, mailed on Sep. 25, 2007, with translation, 5 pages.

Written Opinion issued in PCT/JP2007/062178, mailed on Sep. 25, 2007, 3 pages.

* cited by examiner

RADIO COMMUNICATION APPARATUS AND METHOD USED IN MOBILE COMMUNICATION SYSTEM

TECHNICAL FIELD

The present invention relates to a technical field of mobile communications. More particularly, the present invention relates to a radio communication apparatus and a method used in a mobile communication system.

BACKGROUND ART

In this kind of technical field, research and development on the next generation mobile communication system including radio access schemes, retransmission control, handover and the like are being conducted at high speed.

FIG. 1 shows an example of a retransmission control procedure. The right side of the figure shows operations of an entity (TxMAC) of the medium access control (MAC) sublayer and an entity (TxRLC) of the radio link control sublayer in the transmission side. The left side of the figure shows operations of an entity (RxMAC) of the medium access control (MAC) sublayer and an entity (RxRLC) of the radio link control sublayer in the reception side. In a downlink, a transmitter is a base station, and a receiver is a user apparatus. In an uplink, the transmitter is a user apparatus and the receiver is a base station.

In steps S21 and S22, a packet to be transmitted is prepared. From the MAC sublayer to the RLC sublayer, a packet to be transmitted is requested (new data request). A transmission packet is prepared in the MAC sublayer according to this request. In the example shown in the figure, a sequence number "0" is provided to this packet, that is, a packet data unit (PDU) (SN=0).

As indicated in step S11, the packet prepared in the transmission side is transmitted to the reception side. In this case, the packet data unit including user data specified by the sequence number (SN) is transmitted by a data channel, control information such as user identification information (UE-ID), process number (Proc) and a new data indicator (NDI) is transmitted by a control channel, and one that is broadcasted by a broadcast channel is used as a system frame number (SFN) indicating absolute transmission timing in the cell.

The receiver that receives the control channel and the data channel together with the broadcast channel executes error detection for the received packet using a cyclic redundancy check (CRC) method, for example. The error detection result indicates being negative (NACK) or being positive (ACK). The former indicates that an error exceeding an allowable range is detected, and the latter indicates the inverse. In the example shown in the figure, an error is detected (CRC:NG).

As indicated in step S12, an error detection result is reported to the transmission side. In response to a negative error detection result, the transmission side specifies a packet related to the negative acknowledgement to retransmit the packet. The packet transmitted from the transmission side is stored in a buffer (retransmission buffer) even after radio transmission, and is discarded when a positive error detection result (ACK) is obtained. Therefore, when a negative error detection result is reported, a packet that was transmitted before is specified according to the negative error detection result, and the specified packet is retransmitted.

In the example shown in the figure, since a negative acknowledgement (NACK) is transmitted in step S12, the transmission side also should recognize it and proper retransmission should be performed. However, due to status of the radio link, there is a case in which the transmission side (TxMAC) performs erroneous recognition as if a positive error detection result were reported. In the example in the figure, although the reception side returns the negative acknowledgement, the transmission side proceeds with its process as if a positive acknowledgement were reported.

As a result, a subsequent another packet is prepared in steps S23 and S24, and the packet is transmitted from the transmitter to the receiver as indicated by step S13. In the example shown in the figure, a packet of SN=4 is radio-transmitted at a timing of SFN=8 together with control information of Proc=0 and NDI=1.

The receiver refers to the process number (Proc) and the new data indicator (NDI) and the like to ascertain that a new packet that is not a retransmission packet is transmitted even though returning a negative acknowledgement in the past. As a result, it can be detected that a negative acknowledgement is erroneously processed as a positive acknowledgement.

As indicated by step S14, according to this error detection result, an indicator including a system frame number (SFN=3) of the packet of the retransmission subject is generated, and is reported to the transmission side. The transmission subject is the packet for which the error detection result was the negative acknowledgement, and it can be identified by the error detection result performed after step S11 and SFN. This indicator may be referred to as False Ack Indicator (FAI).

The transmitter extracts a system frame number (SFN=3) included in the reported indicator. A sequence number of a packet transmitted at the timing of the system frame number (SFN=3) is 0. This is stored in the transmission side. The sequence number of the packet to be retransmitted is specified from the reported system frame number in the above-mentioned way.

As indicated in step S25, the specified sequence number (SN=0) is reported to the TxRLC sublayer that manages the transmission packet, and after that, the packet is retransmitted to the reception side. For the sake of simplifying the figure, steps after the step S26 are not shown.

Accordingly, even though erroneous recognition of the error detection result (ACK/NACK) occurs in the transmitter side, the reception side can specify a packet that should be retransmitted so that proper retransmission control can be performed. Such a method is described in the non-patent document 1, for example.

[Non-patent document 1] R2-060907, "MAC functions: ARQ", Samsung

DISCLOSURE OF THE INVENTION

Problem to be Solved by the Invention

In the above method, by receiving further packet (SFN=8) after receiving the packet (SFN=3) for which an error occurs, erroneous recognition of the error detection result for the previous data transmission (SFN=3) can be detected. Therefore, the above method cannot detect erroneous recognition of an error detection result of a last packet.

As an error detection method that can be also applied to the last packet, there is a method in which, for example, a poll bit is prepared for each packet so that it is determined whether a packet is a last packet based on the content of the bit. In this method, when a packet in which the poll bit is a predetermined value (1, for example) is received, it means that the packet is the last packet, so that error detection results for all of packets received before are collectively transmitted to the transmission side.

In any of the above-mentioned methods, if a method is used independently, it is difficult to detect erroneous recognition of error detection results for all packets. Therefore, it can be considered to combine these methods and other methods. However, combining methods causes complication of control, which is not advantageous from the viewpoint of effectively utilizing system resources.

An object of the present invention is to unify detection methods for detecting erroneous recognition of the error detection result to strengthen retransmission control function.

Means for Solving the Problem

According to the present invention, a radio communication apparatus including a retransmission control function is used. The radio communication apparatus includes: determination means configured to determine whether a result of error detection performed in a communication partner side for a first packet after transmitting the first packet to the communication partner is positive acknowledgement or negative acknowledgement; request means configured to request a following second packet from an upper layer when the result of error detection is determined to be positive acknowledgement; and means configured to transmit dummy data to the communication partner as a following second packet when the first packet is the last packet. When the determination determining that the result of error detection is positive acknowledgement is incorrect, a system frame number used when transmitting the dummy data is reported from the communication partner, so that the first packet is retransmitted.

Effect of the Invention

According to the present invention, methods for detecting a retransmission trigger can be unified so that the retransmission control function can be strengthened.

Figure 1:
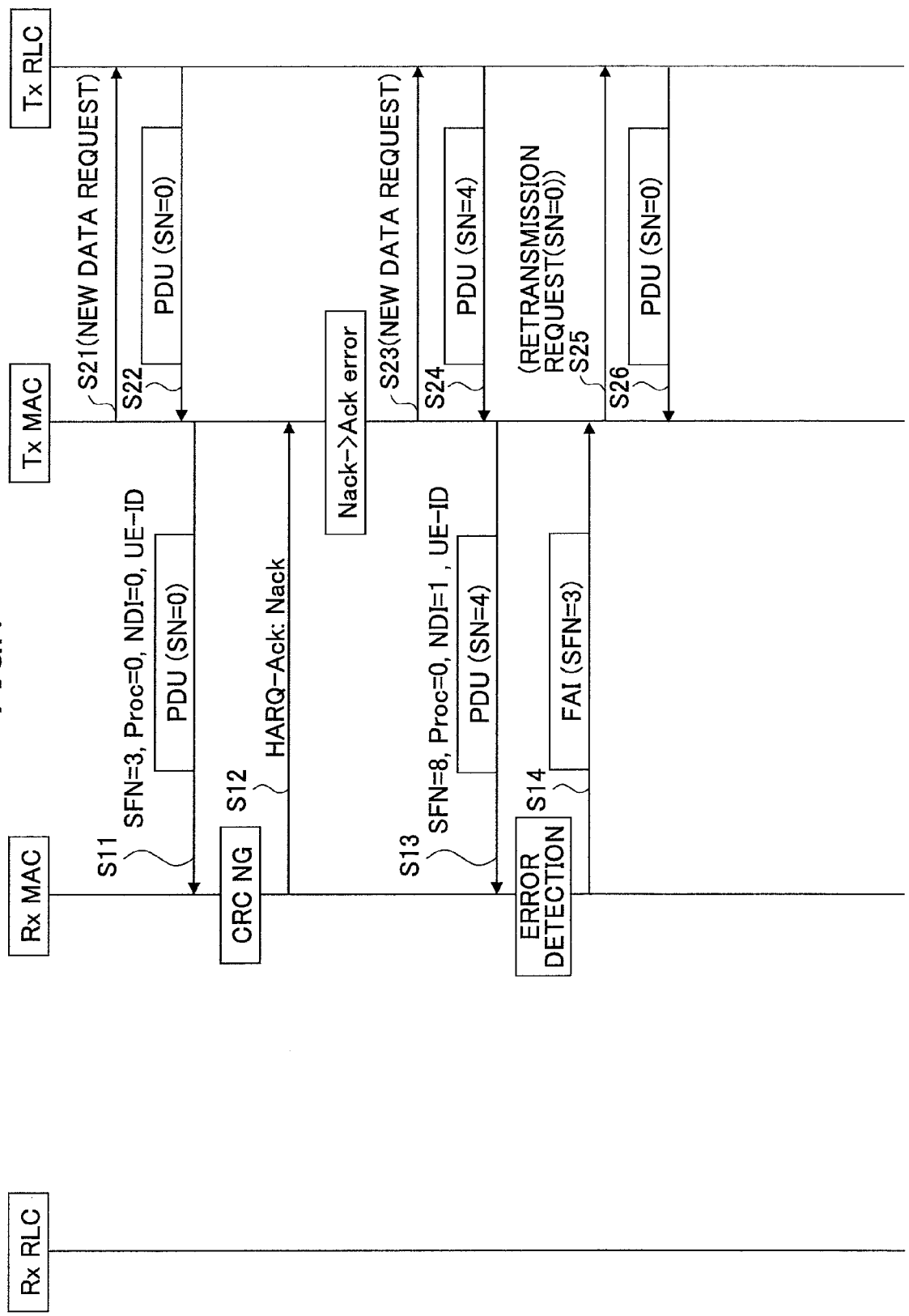
FIG. 1 is a flowchart showing a conventional operation procedure for addressing erroneous recognition of ACK/NACK.

DESCRIPTION OF REFERENCE SIGNS 11 reception unit
12 ACK/NACK determination unit
13 error detection unit
14 FAI generation unit
21 new data request unit
22 new/dummy packet generation unit
23 transmission unit
24 FAI analyzing unit
31 transmission buffer management unit

PREFERRED EMBODIMENTS FOR CARRYING OUT THE INVENTION

Figure 2:
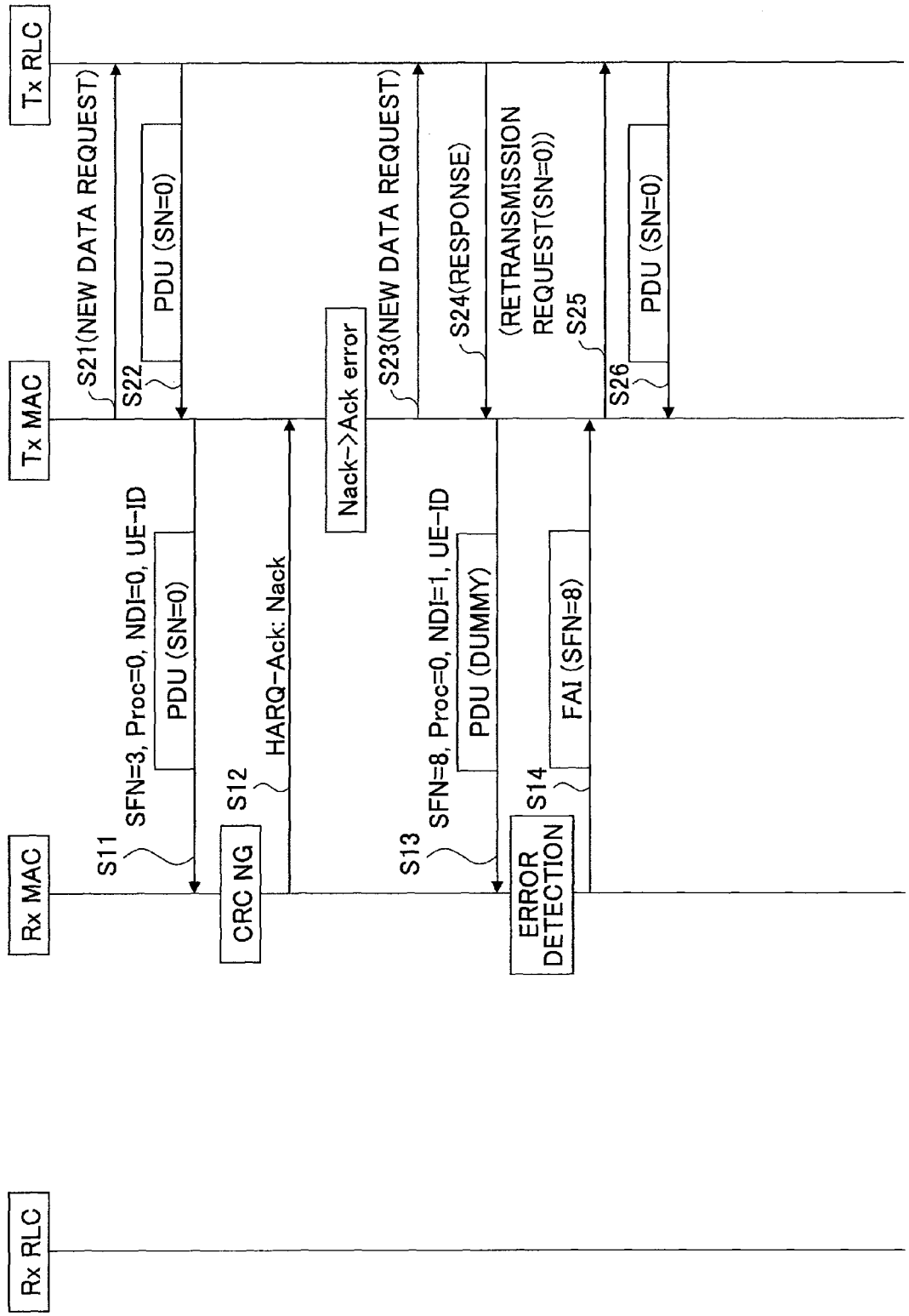
FIG. 2 is a flowchart showing an operation procedure according to an embodiment of the present invention.

FIG. 2 is a flowchart showing an operation procedure according to an embodiment of the present invention. The operation shown in the figure may be used for uplink or may be used for downlink. In the downlink, the transmitter is a base station and the receiver is a user apparatus. In the uplink, the transmitter is a user apparatus and the receiver is a base station. For the sake of explanation, it is assumed that the transmitter is a base station and the receiver is a user apparatus. In steps S21 and S22, a packet to be transmitted is prepared. From the MAC sublayer to the RLC sublayer, a packet to be transmitted is requested. A transmission packet is prepared in the MAC sublayer according to this request. In the example shown in the figure, a sequence number "0" is provided to this packet, that is, a packet data unit (PDU) (SN=0).

As indicated by step S11, the packet prepared in the transmission side is transmitted to the reception side. In this case, the packet data unit including user data specified by the sequence number (SN) is transmitted by a data channel, control information such as user identification information (UE-ID), process number (Proc), a new data indicator (NDI) and transmission format information used for reconstructing a data channel is transmitted by a control channel, and one that is broadcasted by a broadcast channel is used as a system frame number (SFN) indicating absolute transmission timing in the cell.

The receiver that receives the control channel and the data channel together with the broadcast channel executes error detection for the received packet using a CRC method, for example. An error detection result indicates being negative (NACK) or being positive (ACK). The former indicates that an error exceeding an allowable range is detected, and the latter indicates the inverse. In the example shown in the figure, an error is detected (CRC:NG).

As indicated in step S12, an error detection result is reported to the transmission side. In the example shown in the figure, since a negative acknowledgement (NACK) is transmitted in step S12, the transmission side also should recognize it and proper retransmission should be performed. However, due to status of the radio link, erroneous recognition occurs in the transmission side (TxMAC) as if a positive error detection result were reported. In the example shown in the figure, although the reception side returns a negative acknowledgement, the transmission side proceeds with its process as if a positive acknowledgement were reported.

As a result, as indicated in step S23, TxMAC requests packet data to be transmitted next from TxRLC. When following packet data exists, the following packet is transmitted to the TxMAC as a response signal in the same way as the case of step S22. However, in the example shown in the figure, there is no following data, and the previously transmitted packet (packet (SN=0) transmitted in SFN=3 in step S11) is the last packet.

In step S24, information indicating that there is no following packet is reported to TxMAC. In response to that, TxMAC generates a transmission packet including dummy data, and transmits it as if the transmission packet is a packet following the packet (SN=0) transmitted in step S11. That is, a pseudo following packet is generated.

By the way, it is desirable that the timing at which the information indicating that there is no following packet is transmitted from the step S24 is a timing after elapse of a predetermined period after the request of step S23 is received. From the viewpoint for determining that the packet transmitted in preceding SFN(=3) is the last packet with reliability, it is desirable that the predetermined period is set to be longer than arrival interval of packets arriving at the TxRLC sublayer, for example. Further, since the arrival interval may be different depending on applications, the predetermined period may be different depending on applications.

As indicated in step S13, the transmission packet including dummy data is radio-transmitted to the reception side with associated information such as SFN=8, Proc=0 and NDI=1.

The receiver receives the packet including the dummy data so as to extract the associated information. The transmission packet including the dummy data may be transmitted while specifying the type of a control packet data unit (Control PDU), for example. Each type may be classified in a way that type 1 indicates dummy data, type 2 indicate FAI, and the like, so that control packet data units may be chosen.

The receiver refers to the process number (Proc) and the new data indicator (NDI) and the like to confirm that a packet (a pseudo new packet including dummy data) which is not a retransmission packet is transmitted although having returned a negative acknowledgement in the past. As a result, it can be detected that processes are progressing in which the negative acknowledgement is erroneously regarded as a positive acknowledgement.

In the present embodiment, following such error detection, an indicator including the newest system frame number (SFN=8) referred to in the error detection is generated. In other words, an indicator including SFN of the newest control channel that was properly received is generated. As indicated in step S14, this indicator is reported to the transmission side. This indicator may be also referred to as False Ack Indicator (FAI). Also in step S14 in FIG. 1, a signal called FAI is transmitted. However, FAI used in the present embodiment includes SFN of the newest control channel, but FAI described in FIG. 1 is not the newest SFN, but is a SFN of a packet that should be retransmitted (this SFN may be referred to as SFN associated with a control channel transmitted with a retransmission subject), so it should be noted especially that meanings of the FAIs are largely different.

The transmitter extracts the system frame number (SFN=8) included in the reported indicator. In system frame numbers preceding the system frame number (SFN=8), system frame number of the same process number addressed to the present user identification information (for the sake of convenience, the system frame number is called preceding system frame number) is 3. This is stored in the transmission side.

In the RLC sublayer, a retransmission buffer is managed, and a transmitted packet is held with attribute information associated with the packet until a positive acknowledgement is reported. The associated attribute information may include user identification information (UE-ID), a sequence number (SN) of the packet, a system frame number (SFN) specifying a transmission timing, a process number (Proc) specifying a process number, and the like. In the example shown in FIG. 2, as to the packet addressed to the receiver, following information items may be stored in the retransmission buffer:

SN=0: SFN=3, Proc=0
SN=4: SFN=8, Proc=0

Therefore, the transmitter can specify a sequence number (SN=0) of the packet to be retransmitted from the reported system frame number (SFN=8).

As indicated in step S25, the specified sequence number (SN=0) is reported to the TxRLC sublayer that manages the transmission packet, and after that, the packet is retransmitted to the reception side. For the sake of simplicity of the figure, steps after step S26 are not shown.

By the way, the system frame number (SFN) may represent a minimum time unit such as a transmission unit (1.0 ms, for example) of a radio packet, or may correspond to a time unit larger than that. In the latter case, when performing signal processing with the smallest time unit, some information corresponding to a period shorter than the system frame number (SFN) becomes necessary. As the information, a subframe number may be used, for example. For example, when SFN is prepared in units of 10 ms, 10 subframes of 1.0 ms are include in it. In this case, by using subframe numbers 0-9, processes can be performed in a time unit shorter than SFN. The subframe may be called Transmission Time Interval (TTI), and the subframe is 1.0 ms typically, but, other value such as 0.5 ms may be used.

Figure 3:
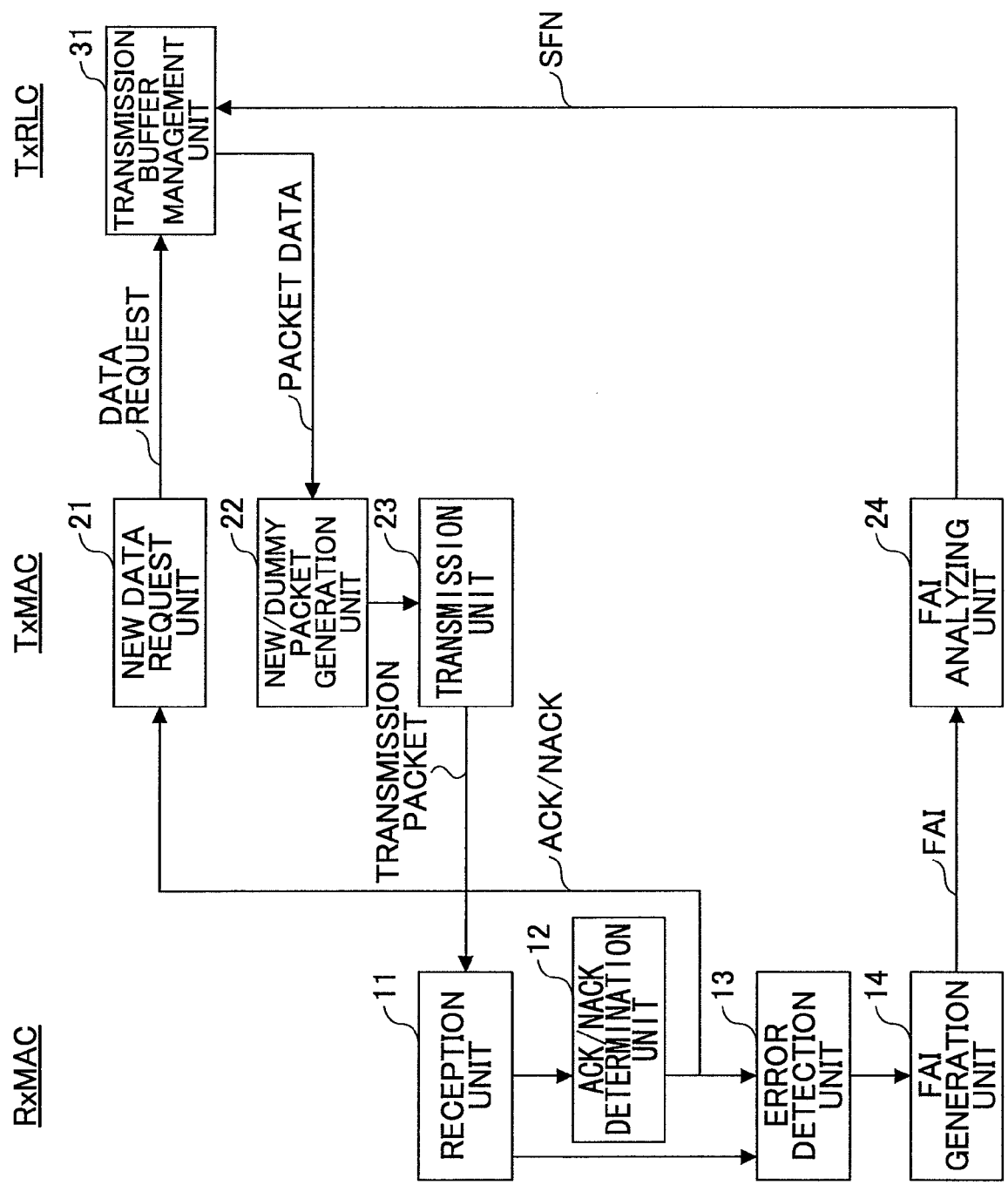
FIG. 3 shows a functional block diagram for entities used in an embodiment of the present invention.

FIG. 3 shows a functional block diagram for entities used in an embodiment of the present invention. The operation shown in FIG. 2 is realized by functional units of the entities. RxMAC in the reception side is provided with a reception unit 11, an ACK/NACK determination unit 12, an error detection unit 13 and a FAI generation unit 14. TxMAC in the transmission side is provided with a new data request unit 21, a new/dummy packet generation unit 22, a transmission unit 23, and a FAI analyzing unit 24. TxRLC of the transmission side is provided with a transmission buffer management unit 31.

The reception unit 11 of RxMAC in the reception side receives a radio signal, extracts a signal of the own apparatus, and transfers the signal to a process element in the latter stage. In addition, the reception unit 11 of RxMAC reports to the error detection unit 13 a process number (Proc), a value of a new data indicator (NDI) and a system frame number (SFN) that are associated with the received control channel addressed to the own apparatus.

The ACK/NACK determination unit 12 performs error detection for the received signal. Error detection may be performed by a CRC method, for example. The error detection result is reported not only to the error detection unit 13 but also to the transmission side.

The error detection unit 13 determines whether reception of control channel was failed in the past. When it is determined that the reception was failed, the FAI generation unit 14 is instructed to generate FAI.

The FAI generation unit 14 generates an indicator including a system frame number (SFN) of a packet that is received recently. The indicator is transmitted by radio.

The new data request unit 21 of TxMAC of the transmitter receives the report of the error detection result (ACK/NACK) from the receiver. According to content of the report, the new data request unit 21 requests data to be transmitted in a next transmission timing from the transmission buffer management unit 31. However, when the new data request unit 21 receives a report of an error detection result for a packet including dummy data, the new data request unit 21 does not request the data to be transmitted at a next transmission timing from the transmission buffer management unit 31. That is, the new data request unit 21 has a function to prohibit such request.

The new/dummy packet generation unit 22 generates a new packet to be transmitted at a next timing or a transmission packet for radio-transmitting a dummy packet. The transmission packet forms a control channel or a data channel.

The transmission unit 23 transmits the generated transmission packet.

The FAI analyzing unit 24 receives the indicator generated in the reception side to extract a system frame number (SFN) included in the indicator. The extracted SFN is provided to the transmission buffer management unit 31.

The transmission buffer management unit 31 of the TxRLC of the transmission side stores packet data to be radio-transmitted into a buffer so as to extract the packet data as necessary and send it to the transmission packet generation unit 22. The buffer stores not only packet data for initial transmission but also packet data for retransmission. The packet data for retransmission is stored with attribute information associated with it.

According to the present embodiment, after the last packet is transmitted, a pseudo following packet including dummy data is transmitted, so that erroneous recognition of error detection result can be detected using the same method irrespective of whether the received packet is the last packet, so that a packet to be retransmitted can be properly specified.

As mentioned above, the present invention may be used in the uplink, or may be used in the downlink. In the downlink, the transmitter is a base station, and the receiver is a user apparatus. In this case, the system frame number (SFN) is transmitted as broadcast information, and the process number (Proc), the new data indicator (NDI) and the user ID (UE-ID) are transmitted as control information. In the uplink, the transmitter is a user apparatus and the receiver is a base station. In this case, SFN is specified as SFN at the time of reception by the base station. Proc can be specified from the specified SFN (as an example, it is specified by performing predetermined modulo calculation on SFN). As to NDI and UE-ID, the base station can specify these from the result of scheduling in the uplink. In the scheduling, it is determined which user can transmit which packet by using which resource. The base station stores the determination content, so that the base station can specify NDI, UE-ID and the like.

The present invention has been described with reference to the specific embodiments of the present invention, but each embodiment is simply an example, and, variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions are included in the present invention without deviation from the spirit of the present invention.

The present international application claims priority based on Japanese patent application No. 2006-170703, filed in the JPO on Jun. 20, 2006 and the entire contents of the Japanese patent application No. 2006-170703 is incorporated herein by reference.

The invention claimed is:

1. A radio communication apparatus including a retransmission control function, comprising:
   determination means configured to determine whether a result of error detection performed in a communication partner side for a first packet after transmitting the first packet to the communication partner is positive acknowledgement or negative acknowledgement;
   request means configured to request a following second packet from an upper layer when the result of error detection is determined to be positive acknowledgement; and
   means configured to transmit dummy data to the communication partner as a following second packet when the first packet is the last packet,
   wherein, when the determination determining that the result of error detection is positive acknowledgement is incorrect, a system frame number used when transmitting the dummy data is reported from the communication partner, so that the first packet is retransmitted.

2. The radio communication apparatus as claimed in claim 1, wherein the dummy data is discarded in the communication partner side in response to occurrence of a predetermined event.

3. The radio communication apparatus as claimed in claim 1, wherein, after the request means request the following second packet from the upper layer, it is checked whether the first packet is the last packet after elapse of a predetermined period that is longer than arrival interval of packets in the upper layer.

4. The radio communication apparatus as claimed in claim 1, wherein the request means includes a function for prohibiting a request corresponding to the result of error detection for the packet including the dummy data.

5. A base station apparatus comprising the radio communication apparatus as claimed in claim 1 used in a mobile communication system.

6. A user apparatus comprising the radio communication apparatus as claimed in claim 1 used in a mobile communication system.

7. A method used in a radio communication apparatus including a retransmission control function, comprising:
   a step of determining whether a result of error detection performed in a communication partner side for a first packet after transmitting the first packet to the communication partner is positive acknowledgement or negative acknowledgement;
   a step of requesting a following second packet from an upper layer when the result of error detection is determined to be positive acknowledgement; and
   a step of transmitting dummy data to the communication partner as a following second packet when the first packet is the last packet,
   wherein, when the determination determining that the result of error detection is positive acknowledgement is incorrect, a system frame number used when transmitting the dummy data is reported from the communication partner, so that the first packet is retransmitted.

* * * * *